United States Patent [19]

McShea, III et al.

[11] Patent Number: 4,863,707
[45] Date of Patent: Sep. 5, 1989

[54] METHOD OF AMMONIA PRODUCTION

[75] Inventors: William T. McShea, III, Martinsville; Robert M. Yarrington, Westfield, both of N.J.

[73] Assignee: Engelhard Corporation, Edison, N.J.

[21] Appl. No.: 296,385

[22] Filed: Jan. 6, 1989

Related U.S. Application Data

[63] Continuation of Ser. No. 430,320, Sep. 30, 1982, abandoned.

[51] Int. Cl.$^4$ ................................. C01C 1/04
[52] U.S. Cl. .................... 423/359; 252/373; 252/376; 502/527
[58] Field of Search ............... 423/359; 252/373, 376; 502/527

[56] References Cited

U.S. PATENT DOCUMENTS

| | | | |
|---|---|---|---|
| 2,894,826 | 7/1959 | Stengel | 422/197 |
| 3,278,452 | 10/1966 | Vorum | 252/376 |
| 3,388,074 | 6/1968 | Reitmeier | 252/376 |
| 3,397,962 | 8/1968 | Squires | 252/376 |
| 3,441,393 | 4/1969 | Finneran et al. | 423/359 |
| 3,481,722 | 12/1969 | Pfefferle | 423/415 A |
| 3,751,228 | 8/1973 | Semenov | 423/359 |
| 4,089,941 | 5/1978 | Villemin | 502/527 |
| 4,189,404 | 2/1980 | Keith et al. | 502/527 |
| 4,233,187 | 11/1980 | Atwood et al. | 502/527 |
| 4,337,178 | 6/1982 | Atwood et al. | 502/527 |
| 4,391,794 | 7/1983 | Silberring | 423/650 |

FOREIGN PATENT DOCUMENTS

| | | | |
|---|---|---|---|
| 38290 | 3/1979 | Japan | 502/527 |
| 2037342 | 7/1980 | United Kingdom | 502/527 |
| 2067915 | 8/1981 | United Kingdom | 502/527 |

Primary Examiner—John Doll
Assistant Examiner—Wayne A. Langel

[57] ABSTRACT

A process for the production of ammonia from a hydrocarbonaceous feed, comprising preheating an inlet stream comprising a hydrocarbonaceous feed, H$_2$O, air and oxygen to a preheat temperature sufficiently high to initiate catalytic oxidation of the feed, introducing the preheated inlet stream into a first catalyst zone comprising a monolithic body having a plurality of gas flow passages extending therethrough and having a catalytically effective amount of palladium and platinum catalytic components dispersed therein, passing the first zone effluent to a second catalyst zone containing a platinum group metal steam reforming catalyst to form a hydrogen-containing synthesis gas, and passing the synthesis gas into an ammonia synthesis loop.

31 Claims, 1 Drawing Sheet

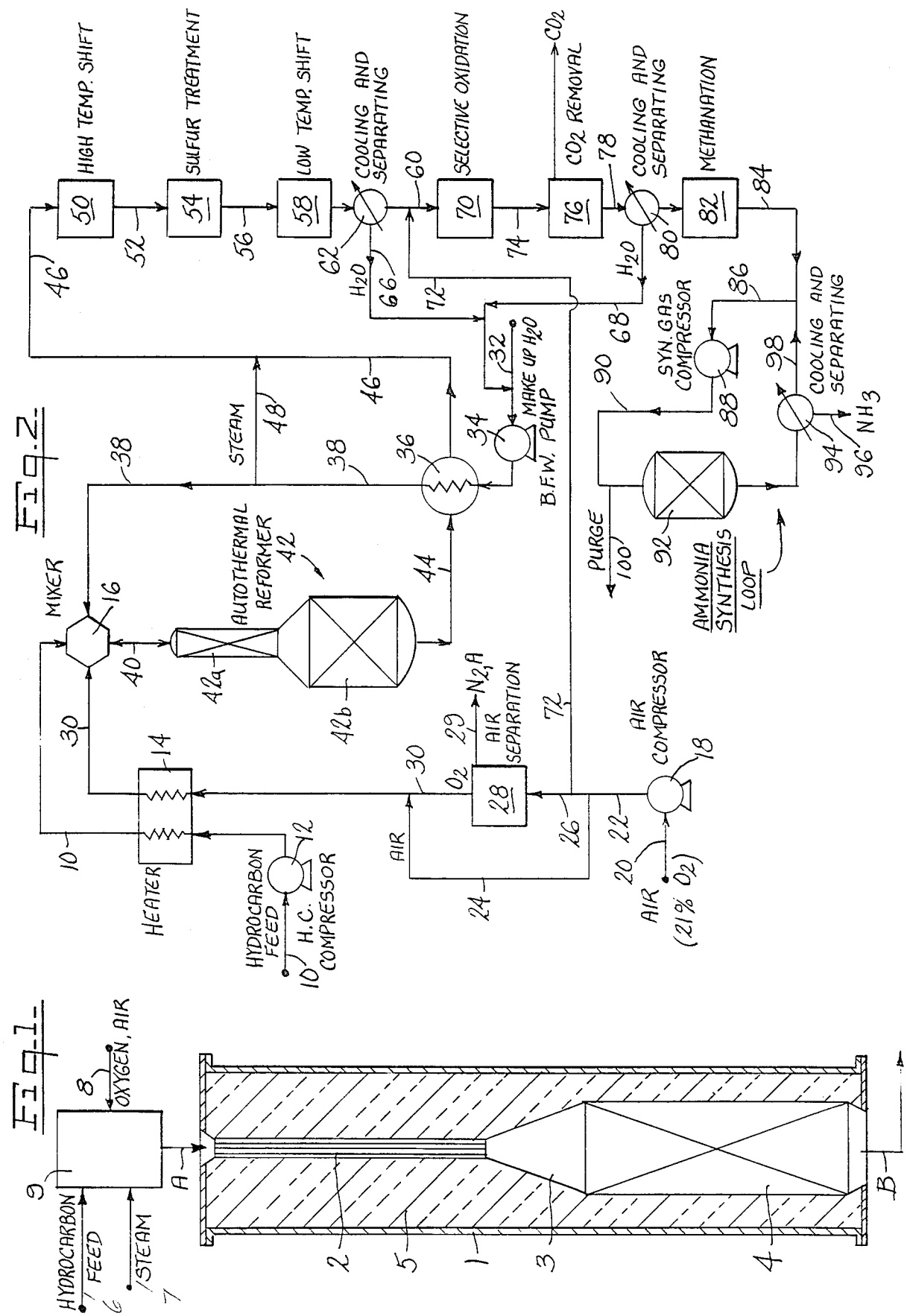

METHOD OF AMMONIA PRODUCTION

This is a continuation of co-pending application Ser. No. 430,320 filed on Sept. 30, 1982, abandoned.

BACKGROUND OF THE INVENTION

The present invention is concerned with the production of ammonia from a hydrocarbonaceous feed, including the preparation of an ammonia synthesis gas containing hydrogen, more particularly, with the preparation of a synthesis gas comprising hydrogen and nitrogen in selected molar ratios and the reacting of these constituents to form ammonia.

As used herein and in the claims, the term "hydrocarbonaceous feed" is intended to include, without limitation, hydrocarbon feeds of all types, as well as alcohols such as ethanol, methanol and mixtures thereof, and biomass-derived feeds which normally contain compounds of carbon, hydrogen and oxygen, and sometimes compounds of nitrogen and sulfur, as well as one or more of the foregoing elements in elemental form. Such biomass-derived feeds may be obtained by any suitable process such as fermentation of grains or other materials including food products generally, from treatment of agricultural by-products and waste products, or by distillation or combustion (with insufficient oxygen for stoichiometric reaction) of wood and/or other cellulosic products and by-products.

Reference hereinbelow and in the claims to a "synthesis gas" or "synthesis gases" will be understood to mean a gas mixture comprising hydrogen and nitrogen, possible with other constituents, such as $H_2O$, carbon dioxide, sulfur compounds, inert gases and the like. Such other constituents are often removed prior to or during the ammonia synthesis operation in which the synthesis gas is reacted.

Ammonia synthesis gas may be prepared by the partial oxidation of hydrocarbonaceous feeds, such as the heavier hydrocarbons, e.g., fuel oil and coal, and by steam reforming of hydrocarbonaceous feeds, such as the lighter hydrocarbons, e.g., natural gas and naphthas. Processes to derive synthetic gases from methanol or coal derived hydrocarbons are also known.

Generally, difficulties associated with the preparation of synthesis gases from heavier feedstocks favor the use of light naphthas or natural gas when a hydrocarbon is the source of the hydrocarbonaceous feed. However, shortages of such light hydrocarbon feeds indicate the need for an economical process for generating a synthesis gas from heavier hydrocarbon feedstocks, such as normally liquid hydrocarbons.

Steam reforming is a well known method for generating synthesis gas from light hydrocarbon feeds and is carried out by supplying heat to a mixture of steam and a hydrocarbon feed while contacting the mixture with a suitable catalyst, usually nickel. However, steam reforming is generally limited to paraffinic naphtha and lighter feeds which have been de-sulferized and treated to remove nitrogen compounds, because of difficulties in attempting to steam reform heavier hydrocarbons and the poisoning of steam reforming catalysts by sulfur and nitrogen compounds. Further, steam reforming for ammonia production generally must be carried out in two stages, a primary steam reforming stage and a secondary steam reforming stage. The former requires a tubular furnace containing catalysts disposed within the tubes and means to supply heat to the tubes in order to sustain the endothermic steam reforming reaction. Secondary reforming is usually carried out in a separate vessel to which oxygen is added to carry out a partial combustion to supply additional heat for the endothermic steam reforming step. Such processes are well known to the art, as indicated by the article "Checklist for High Pressure Reforming" by Orlando J. Quartulli appearing at pages 151-162 of *Hydrocarbon Processing*, April, 1965, Vol. 44, No. 4.

Another known method of obtaining hydrogen from a hydrocarbon feed is the partial oxidation process in which the feed is introduced into an oxidation zone maintained in a fuel rich mode so that only a portion of the feed is oxidized. Steam may be injected into the partial oxidation reactor vessel to react with the feed and with products of the partial oxidation reaction. The process is not catalytic and requires high temperatures to carry the reactions to completion, resulting in a relatively high oxygen consumption. On the other hand, the partial oxidation process has the advantage that it is able to readily handle hydrocarbon liquids heavier than paraffinic naphthas and can even utilize coal as the source of the hydrocarbon feed.

Catalytic autothermal reforming of hydrocarbon liquids is also known in the art, as evidenced by a paper *Catalytic Autothermal Reforming of Hydrocarbon Liquids* by Maria Flytzani-Stephanopoulos and Gerald E. Voecks, presented at the American Institute of Chemical Engineers' 90th National Meeting, Houston, Tex., April 5-9, 1981. Autothermal reforming is defined therein as the utilization of catalytic partial oxidation in the presence of added steam, which is said to increase the hydrogen yield because of simultaneous (with catalytic partial oxidation) steam reforming being attained. Steam, air and a No. 2 fuel oil are injected through three different nickel particulate catalysts and the resulting product gases contained nitrogen, hydrogen and carbon oxides.

In *Brennstoff-Chemie* 46, No. 4, p. 23 (1965), a German publication, Von P. Schmulder describes a Badische Anilin and Soda Fabrik (BASF) process for autothermal reforming of gasoline utilizing a first, pelletized, platinum catalyst zone followed by a second, pelletized nickel catalyst zone. A portion of the product gas is recycled to the process.

Disclosure of the utilization of a noble metal catalyzed monolith to carry out a catalytic partial oxidation to convert more than half of the hydrocarbon feedstock upstream of a stream reforming zone is discussed in abstract entitled "Evaluation of Steam Reforming Catalyst for use in the Autothermal Reforming of Hydrocarbon Feed Stocks" by R.M. Yarrington, I.R. Feins, and H.S. Hwang (National Fuel Cell Seminar, July 14-16, 1980, San Diego, Calif.) The abstract noted the unique ability of rhodium to steam reform light olefins with little coke formation and noted that results were obtained for a series of platinum-rhodium catalysts with various ratios of platinum to total metal in which the total metal content was held constant.

U.S. Pat. No. 4,054,407, assigned to the assignee of this application, discloses two-stage catalytic oxidation using platinum group metal catalytic components dispersed on a monolithic body. At least the stoichiometric amount of air is supplied over the two stages and steam is not employed.

U.S. Pat. No. 3,481,722, assigned to the assignee of this application, discloses a two-stage process for steam reforming normally liquid hydrocarbons using a platinum group metal catalyst in the first stage. Steam and hydrogen, the latter of which may be obtained by partially cracking the hydrocarbon feed, are combined with the feed to the process.

The present invention provides a highly efficient method for producing synthesis gases from hydrocarbonaceous feeds, including hydrocarbons, which attains excellent yields in a relatively compact and simple apparatus.

SUMMARY OF THE INVENTION

In accordance with the present invention there is provided a process for the production of ammonia from a hydrocarbonaceous feed, the process comprising the following steps. Preheating an inlet stream comprising a hydrocarbonaceous feed, $H_2O$, air and oxygen to a preheat temperature sufficiently high to initiate catalytic oxidation of the feed as defined below. Introducing the preheated inlet stream into a first catalyst zone comprising a monolithic body having a plurality of gas flow passages extending therethrough and having a catalytically effective amount of palladium and platinum catalytic components dispersed therein, the amounts of feed, $H_2O$ and oxygen introduced into said first catalyst zone being controlled to maintain in said inlet stream an $H_2O$ to C ratio of from about 0.5 to 5 and $O_2$ to C ratio of from about 0.35 to 0.65. Contacting the preheated inlet stream within the first catalyst zone with the palladium and platinum catalytic components to initiate and sustain therein catalytic oxidation of the feed to produce hydrogen and carbon oxides therefrom, the temperature of at least a portion of said monolithic body being at least about 250° F.(139° C.) greater than the ignition temperature of said inlet stream and oxidizing in the first catalyst zone a quantity, less than all, of the feed, which quantity is sufficient to heat such first zone effluent to an elevated temperature high enough to catalytically steam reform, within a second catalyst zone defined below, hydrocarbon remaining in such first zone effluent without supplying external heat thereto, passing the first zone effluent, while still at an elevated temperature, from the first catalyst zone to a second catalyst zone containing a platinum group metal stream reforming catalyst therein, and contacting the first zone effluent in the second catalyst zone with the reforming catalyst to react hydrocarbons therein with $H_2O$ to produce hydrogen and carbon oxides therefrom, and withdrawing the effluent of the second catalyst zone as a hydrogen-containing synthesis gas and removing heat therefrom to cool the synthesis gas. Reacting carbon monoxide in the synthesis gas with $H_2O$ to produce hydrogen. Removing sulfur containing compounds and $H_2O$ from the synthesis gas. Passing the synthesis gas into an ammonia synthesis loop to react the hydrogen with nitrogen thereof over an ammonia synthesis catalyst at ammonia synthesis conditions, and withdrawing ammonia as product from the ammonia synthesis loop.

In one aspect of the invention, air is introduced as part of the inlet stream with the proportion of air to oxygen being such as to provide oxygen enrichment of the air in the inlet stream to at least about 33 volume percent oxygen, preferably about 33 to 50 volume percent oxygen, whereby to provide a nitrogen-containing hydrogen-rich synthesis gas.

Preferred aspects of the invention provide one or more of the following individual features. The hydrocarbonaceous feed may be a hydrocarbon feed. The preheat temperature may be from about 800° F. to 1400° F. (427° C. to 760° C.) and the first catalyst zone may be maintained at a temperature of from about 1750° F. to 2400° F. (954° C. to 1316° C.), with the first zone effluent being introduced into the second catalyst zone at substantially the same temperature. A volumetric hourly rate of at least 100,000 volumes of throughput per volume of catalyst may be maintained in the first catalyst zone and a volumetric hourly rate of from about 2,000 to 20,000 volumes of throughput per volume of catalyst may be maintained in the second catalyst zone. The first catalyst zone comprises palladium, platinum, and, optionally, rhodium catalytic components distended upon a refractory metal oxide support layer carried on the monolithic body. The steam reforming catalyst may comprise one or both of platinum and rhodium catalytic components, preferably also distended upon a refractory metal oxide support.

In other preferred aspects of the invention, the process may be carried out at a pressure of from about 100 to 1500 psia, more preferably 100 to 1000 psia. The feed may be a normally liquid hydrocarbon or a normally gaseous hydrocarbon.

In another aspect of the invention, the feed is a hydrocarbon and there is included the additional step of treating the synthesis gas withdrawn from the second catalyst zone to convert carbon monoxide therein to carbon dioxide and then removing carbon dioxide from the synthesis gas to provide a carbon oxides-depleted, nitrogen containing synthesis gas. The step of converting carbon monoxide to carbon dioxide may comprise adding additional steam ($H_2O$) to the synthesis gas withdrawn from the secondary catalyst zone and contacting the resulting mixture with a catalyst effective for the water gas shift reaction to convert carbon monoxide to hydrocarbon and carbon dioxide.

Any residual carbon monoxide remaining after the shift conversion may be converted to carbon dioxide by adding oxygen, preferably as air, to the synthesis gas withdrawn from the low temperature shift reactor and contacting the resulting mixture with a catalyst effective for the selective oxidation of carbon monoxide to carbon dioxide.

Preferably, the final molar ratio of hydrogen to nitrogen in the synthesis gas is from about 2.9 to 3.1:1.

Other aspects of the invention provide that the amounts of feed, $H_2O$, and oxygen, and air introduced into the first catalyst zone are controlled to maintain in the inlet stream an $H_2O$ to C ratio of from about 1 to 4, and an $O_2$ to C ratio of from about 0.5 to 0.6.

BRIEF DESCRIPTION OF THE DRAWINGS

FIG. 1 is a schematic elevation view in cross section of a laboratory or pilot plant size embodiment of an autothermal reformer apparatus utilizable in accordance with the present invention; and FIG. 2 is a schematic flow sheet diagram of an ammonia synthesis plant, including a synthesis gas making section in accordance with one embodiment of the present invention, the synthesis gas section including an autothermal reformer.

DESCRIPTION OF THE PREFERRED EMBODIMENTS

In a preferred embodiment of the present invention, a synthesis gas making plant includes an autothermal reformer for generation of hydrogen from a hydrocarbonaceous feed. The autothermal reformer includes a first catalyst zone for carrying out catalytic partial oxidation, an exothermic reaction, and a second catalyst zone for carrying out steam reforming, an endothermic reaction. Some steam reforming also appears to take place in the first catalyst zone and thereby moderates somewhat the temperatures attained in the first catalyst zone inasmuch as the endothermic steam reforming absorbs some of the heat generated by the partial oxidation step. The net reaction in the first catalyst zone is however exothermic and the zone is therefore referred to as an exothermic catalyst zone. The exothermic, first catalyst zone comprises a monolithic catalyst carrier on which a platinum group metal catalyst is dispersed. Such catalyst can effectively catalyze the partial oxidation of not only gaseous and light hydrocarbon liquids such as natural gas or paraffinic naphtha, but of heavier hydrocarbons such as diesel oil, number 2 fuel oil, and coal derived liquids. As compared to a non-catalytic combustion process such as conventional non-catalytic partial oxidation, catalytic partial oxidation enables the utilization of lesser amounts of oxygen and lower temperature levels to both oxidize a portion of the feed and crack heavier hydrocarbon feedstocks to lighter hydrocarbon fractions, while raising the temperature of the reactant mass for subsequent treatment. The ability to use less oxygen in the autothermal reformer is advantageous in making an ammonia synthesis gas in that a portion of the total air to be fed to the process to attain the preselected nitrogen to hydrogen ratio in the product synthesis gas may thus be diverted from the reformer to a downstream selective oxidation process. This has advantages in increasing the overall yield of the process.

Generally, at least about half the hydrocarbon feedstock is partially oxidized in the catalytic partial oxidation zone to produce primarily carbon oxides and hydrogen and the heat required for the endothermic steam reforming reaction, which takes place in the second catalyst zone. Substantially all of the limited amount of oxygen introduced into the first catalyst zone may be consumed in the catalytic partial oxidation step. At the temperature maintained in the catalytic oxidation zone, and in the presence of the product hydrogen and catalyst utilized in the first zone, a degree of hydrocracking of unoxidized $C_5$ and heavier hydrocarbon feed, if any is present, takes place to form $C_4$ and lighter compounds. The effluent gas from the first catalyst zone thus contains primarily CO, $H_2$ and $H_2O$ and, when a hydrocarbon feed is used, $C_2$ to $C_4$ and other lighter hydrocarbons, including olefins, and, depending upon the sulfur content of the feedstock, $H_2S$ and COS. If air, as opposed to oxygen, is used as the oxidant gas, the effluent will of course also contain $N_2$.

The endothermic, second catalyst zone may contain any suitable platinum group metal steam reforming catalyst. Usually, the steam reforming catalyst will be utilized in the form of a particulate bed comprised of spheres, extrudates, granules, configured packing material, e.g., rings, saddles or the like, or any suitable shape. Obviously, a combination of different types of particulate materials may be utilized as the steam reforming catalyst. Further, a monolithic catalyst carrier may be used in the second catalyst zone, as is used in the first catalyst zone. The catalyst metal for the steam reforming zone may comprise any platinum group metals such as, e.g., platinum or rhodium or combinations thereof.

The combination of features provided by the process of the present invention provides a highly efficient process of manufacturing a synthesis gas for ammonia production by converting various types of hydrocarbonaceous feeds, including hydrocarbon feeds, to a hydrogen and nitrogen-rich ammonia synthesis gas. The combination of the monolithic platinum group metal partial oxidation catalyst with a platinum group metal steam reforming catalyst provides a great flexibility in handling diverse feedstocks, including heavy hydrocarbon feedstocks not normally well-suited for generating a synthesis gas. For example, a wide range of $O_2$ to carbon (atoms of carbon in the feed) and $H_2O$ to carbon ratios may be used.

THE MONOLITHIC PARTIAL OXIDATION CATALYST

The partial oxidation catalyst is provided on a monolithic carrier, that is, a carrier of the type comprising one or more monolithic bodies having a plurality of finely divided gas flow passages extending therethrough. Such monolithic carrier members are often referred to as "honeycomb" type carriers and are well known in the art. A preferred form of such carrier is made of a refractory, substantially inert rigid material which is capable of maintaining its shape and a sufficient degree of mechanical strength at high temperatures, for example, up to about 3272° F. (1800° C.). Typically, a material is selected for the support which exhibits a low thermal coefficient of expansion, good thermal shock resistance and, though not always, low thermal conductivity. Two general types of material of construction for such carriers are known. One is a ceramic-like porous material comprised of one or more metal oxides, for example; alumina, alumina-silica, alumina-silica-titania, mullite, cordierite, zirconia, zirconia-spinel, zirconia-mullite, silicon carbide, etc. A particularly preferred and commercially available material of construction for operations below about 2000° F. (1093° C.) is cordierite, which is an alumina-magnesiasilica material. For applications involving operations about 2000° F. (1093° C.), an alumina-silica-titania material is preferred. Honeycomb monolithic supports are commercially available in various sizes and configurations. Typically, the monolithic carrier would comprise, e.g., a cordierite member of generally cylindrical configuration (either round or oval in cross section) and having a plurality of parallel gas flow passages of regular polygonal cross sectional extending therethrough. The gas flow passages are typically sized to provide from about 50 to 1,200, preferably 200–600 gas flow channel per square inch of face area.

The second major type of preferred material of construction for the carrier is a heat- and oxidation-resistant metal, such as a stainless steel or the like. Monolithic supports are typically made from such materials by placing a flat and a corrugated metal sheet one over the other and rolling the stacked sheets into a tubular configuration about an axis parallel to the corrugations, to provide a cylindrical-shaped body having a plurality of fine, parallel gas flow passages extending therethrough. The sheets and corrugations are sized to provide the desired number of gas flow passages, which may range, typically, from about 200 to 1,200 per square inch of end face area of the tubular roll.

Although the ceramic-like metal oxide materials such as cordierite or alumina-silica-titania are somewhat porous and rough-textured, they nonetheless have a relatively low surface area with respect to catalyst support requirements and, of course, a stainless steel or other metal support is essentially smooth. Accordingly, a suitable high surface area refractory metal oxide support layer is deposited on the carrier to serve as a support upon which finely dispersed catalytic metal may be distended. As is known in the art, generally, oxides of one or more of the metals of Groups II, III, and IV of the Periodic Table of Elements having atomic numbers not greater than 40 are satisfactory as the support layer. Preferred high surface area support coatings are alumina, beryllia, zirconia, baria-alumina, magnesia, silica, and combinations of two or more of the foregoing.

The most preferred support coating is alumina, most preferably a stabilized, high-surface area transition alumina. As used herein and in the claims, "transition alumina" includes gamma, chi, eta, kappa, theta and delta forms and mixtures thereof. An alumina comprising or predominating in gamma alumina is the most preferred support layer. It is known that certain additives such as, e.g., one or more rare earth metal oxides and/or alkaline earth metal oxides may be included in the transition alumina (usually in amounts comprising from 2 to 10 weight percent of the stabilized coating) to stabilize it against the generally undesirable high temperature phase transition to alpha alumina, which has a relatively low surface area. For example, oxides of one or more of lanthanum, cerium, praseodymium, calcium, barium, strontium and magnesium may be used as a stabilizer. The specific combination of oxides of lanthanum and barium is a preferred stabilizer for transition alumina.

The catalytic metal of the catalytic partial oxidation catalyst comprises platinum and palladium and, optionally, rhodium. The platinum group metal may optionally be supplemented with one or more base metals, particularly base metals of Group VII and metals of Groups VB, VIB, and VIIB of the Period Table of Elements. Preferably, one or more of chromium, copper, vanadium, cobalt, nickel and iron may be employed.

Desirable catalysts for partial oxidation should have the following properties: They should be able to operate effectively under conditions varying from oxidizing at the inlet to reducing at the exit; they should operate effectively and without significant temperature degradation over a temperature range of about 800° F. to about 2400° F. (427° C. to 1315° C.); they should operate effectively in the presence of carbon monoxide, olefins and sulfur compounds; they should provide for low levels of coking such as by preferentially catalyzing the reaction of carbon with $H_2O$ to form carbon monoxide and hydrogen thereby permitting only a low level of carbon on the catalyst surface; they must be able to resist poisoning from such common poisons as sulfur and halogen compounds; further, all these requirements must be satisfied simultaneously. For example, in some otherwise suitable catalysts, carbon monoxide may be retained by the catalyst metal at low temperatures thereby decreasing or modifying its activity. The combination of platinum and palladium is a highly efficient oxidation catalyst for the purposes of the present invention. Generally, the catalytic activity of platinum-palladium combination catalysts is not simply an arithmetic combination of their respective catalytic activities; the disclosed range of proportions of platinum and palladium have been found to provide efficient and effective catalytic activity in treating a rather wide range of hydrocarbonaceous, particularly hydrocarbon, feeds with good resistance to high temperature operation and catalyst poisons.

The following data compares the effectiveness of palladium, rhodium and platinum, respectively, for the oxidation of methane and further compares the efficacy of, respectively, palladium-platinum, palladium-rhodium and platinum-rhodium combined catalysts for oxidation of methane.

The catalysts of Table I-A comprise a lanthia-chromia-alumina frit impregnated with the platinum group metals by techniques as described above. The frit has the following composition:

| Composition | Weight Percent |
| --- | --- |
| $La_2O_3$ | 3.8 |
| $Cr_2O_3$ | 1.8 |
| $Al_2O_3$ | 94.4 |

The lanthia-chromia stabilized alumina is then impregnated with the platinum group metal and calcined in air for four hours at 230° F. and for an additional four hours at 1600° F. Three catalysts of different platinum metal loadings were prepared as follows:

| Sample No. | Weight Percent | | | |
| --- | --- | --- | --- | --- |
| | Pd | Pt | Rh | Total PGM |
| 4063U-1 | 3.42 | 5.95 | — | 9.37 |
| 4063R-1 | 4.58 | — | 4.52 | 9.10 |
| 4063V-1 | — | 5.62 | 3.14 | 8.76 |

The resultant platinum group metal (PGM) impregnated alumina frit was deposited on alumina beads and the thus-coated beads were placed in a shallow bed and tested by passing a 1% (volume) methane 99% (volume) air feed at about atmospheric pressure through the catalyst. An electric heater was used to cyclically heat the test gas stream fed to the catalyst, and conversion results at the indicated temperatures were obtained on both the heating and cooling phases of each cycle.

The results are shown in the following Table I-A.

TABLE I-A

| Sample No. | PGM (Mole Ratio) | Ignition Temp. °F. | Weight Percent of Original Methane Content Converted at Indicated Temperature (°F.) | | | | | |
| --- | --- | --- | --- | --- | --- | --- | --- | --- |
| | | | 600° | 700° | 800° | 900° | 1000° | 1100° |
| 4063U-1 | Pd, Pt (1:1) | 610 | — | 3 | 10 | 26 | 60 | 80 |
| 4063R-1 | Pd, Rh (1:1) | 710 | — | — | 2 | 5 | 9 | 12 |
| 4063V-1 | Pd, Rh (1:1) | 730 | — | — | 1 | 1 | 3 | 5 |

These data demonstrate the ability of platinum-palladium catalyst to promote catalytic oxidation of methane over a wide range of temperature. Rhodium may optionally be included with the platinum and palldium. The combined platinum group metal catalysts of the invention also have a significant advantage in the ability to catalyze the autothermal reactions at quite low ratios of $H_2O$ to carbon (atoms of carbon in the feed) and oxygen to carbon, without significant carbon deposition on the catalyst. This important feature provides flexibility in selecting $H_2O$ and $O_2$ to C ratios in the inlet streams to be processed.

The platinum group metals employed in the catalysts of the present invention may be present in the catalyst composition in any suitable form, such as the elemental metals, as alloys or intermetallic compounds with the other platinum group metal or metals present, or as compounds such as an oxide of the platinum group metal. As used in the claims, the terms palladium, platinum and/or rhodium "catalytic component" or "catalytic components" is intended to embrace the specified platinum group metal or metals present in any suitable form. Generally, reference in the claims or herein to platinum group metal or metals catalytic component or components embraces one or more platinum group metals in any suitable catalytic form. Table I-A demonstrates that the palladium-rhodium and platinum-rhodium combinations are rather ineffective for methane oxidation. The effectiveness of rhodium as a methane oxidation catalyst is attenuated by the relatively high calcination temperature of 1600° F. At a lower calcination temperature used in preparation of the catalyst, say 1100° F., rhodium retains good methane oxidation characteristics. However, the catalytic partial oxidation catalyst of the present invention may operate at ranges well about 1100° F., which would probably also reduce the effectiveness of rhodium for methane oxidation.

The tests in which the results of Table I-A were developed used a bed of the platinum group metal-impregnated frit dispersed on alumina beads, rather than a monolithic body on which the frit is dispersed. The bed of frit-coated beads was of shallow depth to avoid excessive pressure drop. The geometric configuration of a 400 cell/in² monolithic body provides more geometric surface exposed to the reactant gas than does a bed of coated beads. The catalytic partial oxidation reactions of this invention are extremely rapid at the temperatures involved. Therefore, the catalytic metals on the surface of the catalyst body are predominantly involved in the reactions. The results of the tests with coated beads are indicative of results with monolithic bodies, but lower catalytic metal loading can be used with the latter as compared to metal loadings on beads, to attain equivalent results.

Table I-B shows the results of testing a monolithic body-supported catalyst on which a ceria-stabilized alumina frit impregnated with the indicated platinum group metals was dispersed upon a monolithic support. The alumina frit comprised 5% by weight $CeO_2$, balance $Al_2O_3$, impregnated with one or two platinum group metals to provide the loadings indicated in Table I-B. The catalyst was calcined in air at 500° C. for two hours and then was aged 24 hours at 1800° F. in air.

Two different test gases, A and B, having the following compositions were passed through the catalyst:

| COMPOSITION | PARTS PER MILLION (VOL) OR VOLUME PERCENT | |
|---|---|---|
| | A | B |
| $O_2$ | 3% | 3% |
| CO | 1% | 1% |
| $CO_2$ | 10% | 10% |
| $H_2O$ | 10% | 10% |
| NO | 500 ppm | 500 ppm |
| $C_2H_4$ | 300 ppm | — |
| $C_3H_8$ | — | 300 ppm |
| $N_2$ | Balance | Balance |

Table I-B indicates the temperature in degrees centigrade necessary for conversion of 50% by weight of the original amount of the component present, indicated under the column heading $T_{50}$, and the temperature required for 75% by weight conversion, under the heading $T_{75}$. A lower temperature accordingly indicates a more active catalyst. The results obtained are as follows: the platinum group metal (PGM) loading on the monolithic support is shown as grams of platinum group metal per cubic inch of monolithic catalyst.

TABLE I-B

| Catalyst Sample No. | Weight Ratio Pt:Pd | PGM Loading Pt/Pd (g/in³) | Total PGM Loading (g/in³) |
|---|---|---|---|
| 892-68-SSP | 100:00 | .051/— | .051 |
| 892-69-SSP | 82:18 | .044/.010 | .054 |
| 892-70-SSP | 58:42 | .027/.019 | .046 |
| 892-71-SSP | 25:75 | .011/.031 | .042 |
| 892-72-SSP | 0:100 | —/.039 | .039 |
| 892-76-SSP | 11:89 | .003/.025 | .028 |
| P-PX | 100:00 | .035/— | .035 |
| P-PXIIB | 70:30 | .034/.014 | .048 |

| | | Test Gas A | | | | Test Gas B | | | |
|---|---|---|---|---|---|---|---|---|---|
| Component | | CO | | $C_2H_4$ | | CO | | $C_3H_8$ | |
| Percent Conversion | | $T_{50}$ | $T_{75}$ | $T_{50}$ | $T_{75}$ | $T_{50}$ | $T_{75}$ | $T_{50}$ | $T_{75}$ |
| PGM | Sample No. | °C. | | °C. | | °C. | | °C. | |
| (Pt) | 892-68-SSP | 325 | 335 | 325 | 335 | 265 | 275 | 470 | 565 |
| (Pd/Pt) | 892-69-SSP | 270 | 275 | 280 | 290 | 280 | 285 | 545 | 615 |
| (Pd/Pt) | 892-70-SSP | 235 | 250 | 260 | 305 | 260 | 265 | 495 | 640 |
| (Pd/Pt) | 892-71-SSP | 235 | 245 | 260 | 320 | 260 | 270 | 465 | 585 |
| (Pd) | 892-72-SSP | 230 | 235 | 245 | 270 | 245 | 255 | 440 | 510 |
| (Pd/Pt) | 892-76-SSP | 270 | 275 | 275 | 315 | 245 | 255 | 430 | 555 |
| (Pt) | P-PX | 345 | 355 | 350 | 365 | 320 | 330 | 495 | 550 |
| (Pd/Pt) | P-PXIIB | 255 | 265 | 265 | 290 | 245 | 250 | 485 | 585 |

The data of Table I-B demonstrates the lower temperatures at which a palladium-containing catalyst will attain, respectively, 50% and 75% conversion of ethylene as compared to platinum only catalyst. The platinum provides effective catalyzation of other species as well as providing enhanced poison resistence, particularly to sulfur and sulfur compounds.

An exemplary mode of preparation of partial oxidation catalyst compositions utilizable in accordance with the present invention is set forth in the following Example I.

EXAMPLE 1

(A) To 299 g of 5 wt % $CeO_2$—95 wt % $Al_2O_3$ powder (a predominantly gamma alumina which has been stabilized by incorporation of ceria therein) is added a solution containing 21 g Pt as $H_2Pt(OH)_6$ solubilized in monoethanolamine so as to give total volume of 229 ml. After mixing for 5 minutes, 25 ml of glacial acetic acid is added and the material is mixed an additional 5 minutes before being dried and then calcined for one and one-half hours at 350° C. in air to form a free flowing powder.

(b) Similarly, to 229 g of 5 wt % $CeO_2$—95 wt % $Al_2O_3$ powder there is added 21 g Pd as $Pd(nO_3)_3$. The material is mixed and reduced with 16 ml of $N_2H_4 \cdot H_2O$ solution with constant mixing. The impregnated powder is dried and then calcined for one and one-half hours at 375° C. in air.

(c) Two hundred grams of each of powder (a) and (b) is added to a ½ gallon size ball mill with appropriate amount of grinding media. To the powder is added 20 ml of glacial acetic acid and 550 ml of $H_2O$. The sample is ball milled for 16 hours. The resulting slurry has a solids content of 43%, a pH of 4.0 and a viscosity of 337 cps and is used to coat a Corning cordierite monolith having a diameter of 3.66", a length of 3" and 400 gas flow passages (of square cross section) per square inch of end face area. The coating is acomplished by dipping the monolith in the slurry for 2 minutes, draining excess slurry and blowing the excess slurry from the gas flow passages with high pressure air. The resultant slurry-coated monolith is dried at 110° C. and calcined at 500° C. in air for 30 minutes. The finished catalyst body contains 238g of platinum group metal per cubic foot of catalyst body volume at a weight ratio of platinum to palladium of 1:1, with the platinum groups metal dispersed on a ceria-stabilized alumina "washcoat" support layer. The catalyst body contains 1.4 grams per cubic inch of catalyst body of stabilized alumina washcoat.

A series of partial oxidation catalyst compositions utilizeable in accordance with the present invention were prepared by substantially the procedure described in Example 1, with appropriate modifications to obtain the reported loadings of different catalyst metals. Each of the below described materials is a monolithic catalyst composition. Except for the catalyst identified as CPO-5, in each case the honeycomb carrier is a C-400 cordierite carrier (400 gas flow passages per square inch of end face area) manufactured by Corning. The CPO-5 catalyst is on an alpha alumina monolith body, sold under the trademark TORVEX by DuPont, and having 64 gas flow channels per square inch of end face area. The Corning cordierite monoliths have gas flow channels which are square in cross section; those of the TORVEX monolith are hexagonal in cross section. The amount of platinum group metal on the catalyst is given in grams of elemental platinum group metal per cubic foot of monolith catalyst. The weight ratio of the platinum group metals in the order listed is given in parentheses. Thus, catalyst CPO-1 in Table 1, for example, contains platinum and palladium in a weight ratio of one part platinum to one part palladium. In each case, the refractory metal oxide coating is alumina, predominantly comprising gamma alumina stabilized as indicated, the respective weight percents of stabilizer being indicated, the balance comprising substantially alumina.

TABLE I

| Catalyst | PG Metal Component | PG Metal g/ft$^3$ | Weight % and Stabilizer in Support Coating | Alumina Support coating g/in$^3$ (% Stabilizer) |
|---|---|---|---|---|
| CPO-1 | Pt, Pd (1:1) | 219 | 5% ceria | 1.27 |
| CPO-2 | Pt, Pd (1:1) | 186 | 5% ceria | 1.64 |
| CPO-3 | Pt, Pd (1:4) | 275 | 5% ceria | 1.79 |
| CPO-4 | Pt, Pd (1:0) | 310 | 5% ceria | 2.32 |
| CPO-5* | Pt, Pd (1:1) | 200 | 5% ceria | 1.26 |
| CPO-6 | Pt, Pd, Rh (9.5:9.5:1) | 230 | 5% ceria | 1.47 |
| CPO-7 | Pt, Pd (1:1) | 186 | 2.5% lanthia 2.5% baria | 1.64 |

*TORVEX alpha alumina monolith; all others are cordierite monoliths.

Preferred catalyst metals are platinum and palladium and combinations thereof, preferably, combinations comprising about 10–90% by weight palladium, preferably 25–75%, more preferably 60 to 40% by weight palladium, and about 90 to 10% by weight platinum, preferably 75 to 25%, more preferably 40 to 60% by weight platinum. Generally, as the sulfur content of the hydrocarbon feed being treated in the first catalyst zone increases, a higher proportion of the platinum to palladium is preferred. On the other hand, for feeds which have a relatively high methane content, an increasing proportion of palladium is preferred.

The monolithic configuration of the catalytic partial oxidation catalyst of the first catalyst zone affords a relatively low pressure drop across it as compared to the packed bed of a particulate support catalyst. This is particularly important in view of the increase in gas volume occasioned by the reactions taking place in the first catalyst zone. The total moles of product produced in the first catalyst zone is higher than the total moles of $H_2O$ oxidant gas and hydrocarbon feed introduced therein. The individual gas flow passages of the monolith also serve, in effect, as individual adiabatic chambers, thus helping to reduce heat loss and promote hydrocracking. This is particularly so when the monolithic carrier comprises a ceramic-like material such as cordierite which has generally better heat insulating properties than do the metal substrates and, to this extent, the ceramic-type monolithic carriers are preferred over the metal substrate monolithic carriers. Further, as the monolith body becomes heated during operation, it serves as an excellent heat source, radiating heat back towards the incoming gas stream which is pre-heated thereby, thus facilitating desired hydrocracking and oxidation reactions.

STEAM REFORMING CATALYST

The steam reforming catalyst utilized in the second catalyst zone in accordance with the present invention may utilize a monolithic carrier as described above in connection with the partial oxidation catalyst or it may comprise a particulate support such as spheres, extrudates, granules, shaped members (such as rings or saddles) or the like. As used herein and in the claims, the term "particulate catalyst" or the like means catalysts of regularly or irregularly shaped particles or shaped members or combinations thereof. A preferred particulate support is alumina pellets or extrudate having a BET (Brunnauer-Emmett-Teller) surface area of from about 10 to 200 square meters per gram. Alumina or alumina stabilized with rar earth metal and/or alkaline earth metal oxides as described above, may be utilized as the pellets or extrudate. An alumina particulate support stabilized with lanthanum and barium oxides as described above is preferred.

The catalytically active metals for the steam reforming catalyst may comprise any of the catalytic metals known for such purpose, for example, nickel, cobalt and mixtures thereof are well suited for use as steam reforming catalysts. Platinum group metals such as platinum and rhodium or both may also be utilized for steam reforming, as is known in the art. A preferred platinum group metal steam reforming catalyst is a combination of platinum plus rhodium with the rhodium comprising from about 10 to 90% by weight, preferably 20 to 40% by weight, of the total platinum group metal present and the platinum comprises 90 to 10%, preferably 80 to 60%. The proportion of platinum and rhodium utilized will depend on the type of hydrocarbon feed to be treated in the process. Other platinum group metals may also be utilized. For example, as disclosed in U.S. Pat. No. 3,481,722, assigned to the assignee of this application, one or more of platinum, palladium, rhodium, iridium, osmium and ruthenium may be utilized as the steam reforming catalyst.

EXAMPLE 2

(a) A barium nitrate solution is prepared by dissolving 159.9g $Ba(NO_3)_2$ in 1,650 ml of $H_2O$. Lanthanum nitrate, in the amount of 264.9g $La(NO_3)_2 \cdot 6H_2O$ is dissolved in the barium nitrate solution by mixing vigorously to yield a barium-lanthanum solution, to which is added to 3,000g of high surface area gamma alumina powder. The solution and powder are thoroughly mixed in a sigma blade mixer for 30 minutes.

(b) The impregnated alumina resulting from step (a) was extruded through 1/16" diameter dies so as to give 1/16" diameter extrudate in lengths from 1/4" to 38".

(c) The extrudates from step (b) were dried at 110° C. for 16 hours and then calcined 2 hours at 1,050° C. in air.

(d) A platinum-rhodium solution was prepared by dissolving 42.0g Pt as $H_2Pt(OH)_6$ in monoethanolamine and 18.0g Rh as $Rh(NO_3)_3 \cdot 2H_2O$ and combining the materials in $H_2O$ to provide a solution having a volume of 1,186 ml and a pH of 0.7 after adjustment with concentrated $HNO_3$.

(e) The platinum-rhodium solution of step (d) is added to the extrudate obtained in step (c) in a tumbling coater mixed for 30 minutes. The impregnated extrudate is dried at 120° C. for 4 hours and then calcined for 30 minutes at 500° C. in air.

The resultant particulate steam reforming catalyst, designated SR-1, comprises 1.4 wt % platinum and 0.6 wt % rhodium on a $La_2O_3$—BaO stabilized gamma alumina extrudate.

The catalysts of Examples 1 and 2 were utilized in test runs. Before describing these test runs, however, preferred embodiments of the apparatus of the present invention are described in some detail below.

THE REACTOR VESSEL

Preferably, the reactor utilized in the autothermal reforming process of the invention comprises a fixed bed, adiabatic reactor. FIG. 1 shows a somewhat schematic rendition of a preferred laboratory or pilot plant size reactor comprising a unitary vessel 1 within which a monolithic carrier partial oxidation catalyst 2 is disposed in flow communication via a passageway 3 with a bed of steam reforming catalysts 4. The vessel is suitably insulated by thermal insulating material 5 to reduce heat losses and to provide essentially a fixed bed, adiabatic reactor. Inlet lines 6, 7 and 8 feed a mixer 9 with, respectively, a hydrocarbon feed, steam and oxygen. The latter may be introduced as an oxygen containing gas, preferably air. The admixed reactants are introduced through an inlet line A into partial oxidation catalyst 2, thence via passage 3 into steam reforming bed 4 from which the contacted material is withdrawn through outlet line B. Valves, flow meters and heat exchange units, utilized in a manner known to those skilled in the art, are not shown in the schematic illustration of Figure. 1.

In order to exemplify operation of the autothermal reforming process, test runs were carried out in an apparatus substantially in accordance with that schematically illustrated in FIG. 1, in which the monolithic carrier catalyst 2 was of cylindrical configuration, three quarters of an inch in diameter and nine inches long. The steam reforming bed was a cylindrical bed of particulate catalyst three inches in diameter by nine and a quarter inches long. The following test runs were carried out and the indicated results obtained. In operation, the reactants were preheated with the oxidant stream being preheated separately from the hydrocarbon feed as a safety measure. After preheating, the streams were intimately mixed and immediately fed into the partial oxidation catalyst 2 of vessel 1. Generally, all the oxygen present in the feed reacts within monolithic catalyst bed 2 to oxidize a poriton, but not all, of the hydrocarbon feed, resulting in an increase in temperature due to the exothermic oxidation reaction. At least some of the $C_5$ and heavier hydrocarbon is hydrocracked in catalyst bed 2 to lighter, $C_1$ to $C_4$ hydrocarbon fractions. The heated, partially oxidized and hydrocracked effluent from catalyst bed 2 is then passed through steam reforming catalyst bed 4 wherein the steam reforming reaction takes place. The product gases withdrawn via outlet B are cooled and unreacted water as well as any unreacted hydrocarbon feed is condensed and removed therefrom. The dry gas composition was monitored by gas chromatography.

EXAMPLE 3

(a) A monolithic oxidation catalyst made in accordance with Example 1 has the following composition: 186g of platinum group metal (PGM) per cubic foot of catalyst volume, the PGM comprising platinum and palladium in a 1:1 weight ratio. The PGM is distended upon a lanthia-baria stabilized predominantly gamma alumina washcoat dispersed on a Corning cordierite monolith 3/4 inch (1.9 cm) in diameter and 9 inches (22.9 cm) in length, and having 400 gas flow passages per square inch of end face area. The monolith is loaded with 1.64g of washcoat per cubic inch of catalyst volume.

(b) A PGM steam reforming catalyst is provided by 1,075 ml of catalyst SR-1 of Example 2, in a packed bed measuring 3 inches (7.62 cm) in diameter and 9 1/4 inches (23.5 cm) in depth.

(c) The hydrocarbon feed in a No. 2 fuel oil having the following properties:

| | |
|---|---|
| API Gravity: | 34.7 |
| Distillation Range: | 374–664° F. |
| Sulfur Content: | 1200 parts per million (weight) |
| hydrocarbon classes per ASTM D1319: | |
| Aromatics: | 22.0% |
| Olefins: | 5.7% |
| Saturates: | 72.3% |

(d) The reactor vessel is a fixed bed, adiabatic pressure vessel reactor of the type schematically illustrated in FIG. 1. For safety considerations, the oxidant stream, comprising oxygen enriched air, is preheated separately from the hydrocarbon stream in a preheater (not shown in FIG. 1). The steam is separated into two streams, one of which is blended with the oxidant stream and one with the hydrocarbon feed. The preheated streams are intimately mixed within a mixer, schematically illustrated in 9 in FIG. 1, and the combined inlet stream at a pressure of 1 atmosphere and a preheat temperature of 1200° F. (649° C.), is immediately fed to the partial oxidation catalyst. The partial oxidation catalyst (2 in FIG. 1) in the first catalyst zone contains the monolithic catalyst of (a), above, and the steam reforming catalyst (4 in FIG. 1) in the second catalyst zone contains the SR-1 catalyst of (b), above.

All of the oxygen contained in the inlet feed is completely reacted and a sufficient amount of the hydrocarbon is oxidized to heat the effluent reactant mass, by the exothermic catalytic oxidation reaction, to a temperature of 942° C., high enough for steam reforming. The effluent from the catalytic partial oxidation catalyst 2 is immediately flowed into the steam reforming catalyst 4 and then withdrawn via the outlet opening as indicated by the arrow B in FIG. 1, at an exit temperature of 1432° F. (778° C.). The volumetric throughput rate through the partial oxidation catalyst was 126,000 volumes of throughput at standard temperature and pressure per volume of catalyst per hour and the volumetric throughput rate through the steam reforming catalyst (same basis) was 6500.

The product gas is cooled and unreacted water (and any unreacted hydrocarbon oil) is condensed therefrom. The dry gas composition is monitored by gas chromatography and the following results were measured and the results tabulated in Table II. In this illustration air was used instead of oxygen-enriched air. The result of this is that the "equivalent hydrogen", i.e., (CO + $H_2$) to $N_2$ ratio is low, i.e., 1.53/1 instead of 3/1.

TABLE II

| A. Effluent Composition and Hydrocarbon Conversion | |
|---|---|
| Conversion of Dried Product Gas | Dried Product Gas Composition, Mole % As Measured |
| $H_2$ | 41.11 |
| CO | 11.52 |
| $CO_2$ | 12.51 |
| $N_2$ | 34.37 |
| $CH_4$ | 0.26 |
| $C_2H_6$ | 0.01 |
| Hydrocarbon Conversion | 98.8%* |

*weight percent of quantity of hydrocarbon feed to the reactor.

The foregoing Example 3 shows the efficacy of the process for substantially complete (98.8%) conversion of a No. 2 fuel oil, which is a difficult feedstock to convert by conventional steam reforming. The process of the invention can of course readily handle lighter hydrocarbon feeds, which are easier to reform, and use higher $O_2$ to C ratios.

Referring now to FIG. 2, there is shown a schematic illustration of an ammonia synthesis plant which includes a synthesis gas making section in accordance with one embodiment of the present invention. A source of a hydrocarbonaceous feed, in this case a hydrocarbon feed is introduced via line 10 and hydrocarbon feed compressor 12 for passage through a heater 14 and thence to a mixer 16 for admixture with steam and oxygen-enriched air as described below. Hydrocarbon feed compressor 12 compresses the hydrocarbon feed to the elevated pressure at which the autothermal reforming operation is to be carried out. Heater 14 may be of any conventional design and would include a burner means (not shown) for combusting a fuel therein to provide preheating by indirect heat transfer to the streams passing therethrough.

An air compressor 18 is supplied with atmospheric air via an inlet line 20 and compresses the air to the pressure at which the autothermal reforming operation is to be carried out. A portion of the compressed air is passed via lines 22, 24 around an air separation zone 28 to a line 30 for passage to a heater 14 for preheating. Another portion of compressed air from air compressor 18 is passed through line 26 to air separation zone 28 wherein oxygen is separated from the compressed air by any suitable means known to those skilled in the art. The resultant oxygen stream is fed via line 30, into which the air from line 24 is introduced, for passage of the thus oxygen-enriched air via line 30 through heater 14 for preheating and thence to mixer 16. In air separation zone 28, a nitrogen stream 29 which also contains rare gases, including argon, found in air is removed from the process and is normally recovered as a nitrogen gas by-product. The argon and other inert gases which are removed from the process in air separation zone 28 advantageously reduce the total inerts which will ultimately find their way into the ammonia synthesis loop via the synthesis gas and therefore reduces the amount of purge gas which must be withdrawn from the loop.

Air separation plant 28 may use any suitable type of air separation process including, for example, a cryogenic separation process, a membrane diffusion process, or a pressure-swing absorption process utilizing inorganic absorbants or carbon molecular sieves. Although not shown on the flow sheet of FIG. 2, heat available from the autothermal reforming process (shown in FIG. 2 as being utilized only in heat exchanger 36) may also be utilized in the air separation zone 28 if an air separation process is utilized which requires a heat input.

As will be noted from FIG. 2, it is seen that complete separation of a pure oxygen stream from the air is not necessary, but only that an oxygen enriched stream must be obtained to enrich the oxygen content of the air fed to autothermal reformer 42. As illustrated in the schematic diagram of FIG. 2, line 29 carries nitrogen, or at least a nitrogen-enriched stream, away from the air separation plant 28. It may also contain a substantial proportion, if not all, of the argon, which comprises about one percent of atmospheric air, which enters zone 28.

Make up water is introduced via line 32 and boiler feed water pump 34 through heat exchanger 36 wherein the water, together with condensate water recycled from a subsequent point in the process as described below, is heated and steam is generated therefrom. The steam generated in heat exchanger 36 is passed via line 38 to mixer 16. A mixture of oxygen enriched air, steam and hydrocarbon feed obtained in mixer 16 is introduced via inlet line 40 into autothermal reformer 42.

In reformer 42, the inlet stream mixture of hydrocarbon feed, steam and oxygen-enriched air is passed initially through a catalytic partial oxidation catalyst supported on a monolithic honeycomb carrier disposed within the neck portion 42a of reformer 42. The effluent from the first catalyst zone passes into the second catalyst zone comprising a platinum group metal steam reforming catalyst contained within main body portion 42b of autothermal reformer 42. Generally, as mentioned above, a portion, less than all, of the hydrocarbon feed content of the inlet stream is catalytically oxidized within the first catalyst zone. If $C_5$ or heavier hydrocarbons form a part of the feed, they are hydrocracked under the conditions prevailing in the first catalyst zone, to lighter, $C_1$ to $C_4$ constituents. The steam reforming reaction carried out in the second catalyst zone reacts $H_2O$ with unoxidized hydrocarbons to form hydrogen and carbon monoxide. Generally, the inlet stream components (hydrocarbon, oxygen-enriched air, and steam) react in autothermal reformer 42 to produce a mixture containing $H_2$, CO, $CO_2$, $N_2$, $H_2O$ and a small amount of residual methane.

Effluent from autothermal reformer 42 is passed via line 44 through heat exchanger 36 as mentioned above. The temperature of the effluent in line 44 is sufficiently high so that superheated steam may be effectively generated in heat exchanger 36. After the heat exchange in exchanger 36, the autothermal reforming effluent is passed via line 46 to a high temperature shift conversion zone 50. A side stream of steam may be passed via line 48 to increase the proportion of steam in the effluent entering high temperature shift conversion zone 50 to improve the reaction conditions for the shift conversion.

Typically, the temperature of the effluent in line 44 from autothermal reformer 42 will be at a temperature of from 1600° F. to 1900° F. (871° C. to 1038° C.) and will be cooled in heat exchanger 36 to a temperature of about 800° F. to 900° F. (427° C. to 482° C.), which is a temperature suitable for shift conversion as described below.

Shift converters are conventionally employed in conjunction with steam reforming operations. In steam reforming, the hydrocarbon reacts with $H_2O$ to yield a product gas containing primarily hydrogen and carbon monoxide, plus any unreacted hydrocarbons. In order to reduce the carbon monoxide level and enhance the hydrogen yield, the effluent of the steam reforming process may be passed into a so-called shift converter, in which the effluent is contacted with a catalyst of the known type over which carbon monoxide will react with $H_2O$ to yield carbon dioxide and hydrogen according to the following reaction:

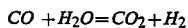

This water gas shift reaction is often carried out in two stages, a first high temperature stage, e.g., 800°–900° F. (427–482° C.) in order to secure high reaction rates and a second, low temperature stage, e.g., 700°–750° F. (371°–399° C.) to enhance the overall yield of the reaction. Accordingly, as shown in FIG. 2, the effluent from reformer 42 is passed via lines 44, 46 into high temperature shift reactor zone 50 in which it is contacted with a suitable catalyst to carry out the shift reaction. Upon emerging from zone 50, the shift-reacted effluent may be passed via line 52 to a sulfur treatment zone 54, which may comprise any suitable equipment for removing or reducing the sulfur content of the gas stream, such as the known iron oxide or zinc oxide dry removal processes, or a known wet method for the removal of sulfur and sulfur compounds. The treated effluent from the sulfur treatment zone 54 is passed via line 56 to a low temperature shift reactor zone 58 in which a second, low temperature shift reaction is carried out to convert carbon monoxide to carbon dioxide and hydrogen. The resultant hydrogen and nitrogen-rich gas stream, containing primarily $N_2$, $H_2$, $CO_2$ and $H_2O$ passes from low temperature shift converter zone 58 via line 60 for introduction into a selective oxidation zone 70.

Prior to passing to selective oxidation zone 70, the effluent from the low temperature shift reactor zone 58 is cooled in cooling and separation zone 62 and water is condensed therefrom. The resulting condensate water may be passed via line 66 together with make up water from boiler feed water pump 34, to heat exchanger 36. The gases are cooled in cooling zone 62 to a temperature suitable for the selective oxidation reaction to be carried out in selective oxidation zone 70, to which the cooled effluents are passed via line 60. Additional oxygen is introduced into the effluent entering selective oxidation zone 70, and this may be accomplished by taking a side stream of compressed air via line 72 and combining it with the cooled effluent in line 60 for passage into selective oxidation zone 70. The amounts of supplemental air introduced via line 72 is calculated both to supply sufficient oxygen for the selective oxidation process, and to provide a molar ratio of nitrogen to hydrogen in the product synthesis gas of approximately 3:1. Selective oxidation zone 70 may be any suitable selective oxidation process in which residual carbon monoxide contained in the effluent is contacted with a catalyst to selectively oxidize the carbon monoxide to carbon dioxide in the presence of hydrogen. A highly efficient catalyst for the purpose is sold under the trademark SELECTOXO by Engelhard Corporation. A selective oxidation process utilizable in an ammonia manufacturing operation is shown in U.S. Pat. No. 4,238,468, issued Dec. 9, 1980 to Bonacci et al, and assigned to Engelhard Corporation. After the selective oxidation treatment, the treated effluent is passed via line 74 to a carbon dioxide removal zone 76 wherein the residual carbon dioxide content of the effluent stream is further reduced by any suitable, known process. Removal or reduction to extremely low values of the carbon dioxide in the synthesis gas is advantageous in that carbon dioxide, under specific temperature and pressure conditions and concentrations, can react with ammonia to form carbamates, and this is of course undesirable in the ammonia synthesis process.

The selective oxidation process is thus utilized for removal or reduction of trace quantities of carbon oxide and is desirable as minimizing the amount of methane formed, as discussed below, in methanation zone 82. The formation of such methane consumes product hydrogen and it is therefore preferable to reduce the carbon monoxide content as much as feasible in zone 70.

The carbon dioxide reduced effluent is passed via line 78 through a second cooling and separation zone 80 in which additional water is condensed therefrom and the water condensate may be recycled via lines 68, 66 to heat exchanger 36 for return to the process as steam.

The cooled gas is then passed through a methanation zone 82 in which residual carbon oxides are contacted over a catalyst in a methanation step in which hydrogen reacts with CO and $CO_2$ to produce methane and water. It will be appreciated that the residual amounts of carbon oxides available to react in the methanation zone are very small. The resulting methane is an inert in the ammonia synthesis process and tends to build up therein. Accordingly, the methane, along with other inerts, must be purged from the ammonia synthesis loop. But this is preferable to the adverse effect in the ammonia synthesis loop of either carbon monoxide, which is an ammonia synthesis catalyst poison, or carbon dioxide, which may react with ammonia as mentioned above, to form explosively decomposable solid carbamates.

The effluent from methanation zone 82 is withdrawn therefrom as product synthesis gas and may be passed through line 84 to an ammonia synthesis process. FIG. 2 illustrates the so-called ammonia synthesis loop, in which the product synthesis gas from line 84 is passed via line 86 to a synthesis gas compressor 88 wherein it is compressed to an elevated pressure, say 1,000 to 15,000 psi and at a relatively low temperature, from about 200°–600° C., suitable for ammonia synthesis. The compressed synthesis gas is passed via line 90 to an ammonia synthesis reactor 92 containing therein a catalyst suitable to react nitrogen with hydrogen to form ammonia. A small proportion only of the nitrogen and hydrogen in the synthesis gas is converted to ammonia in a single pass through the catalyst of ammonia synthesis reactor 92, and the partially reacted gas is passed through a cooling and separating zone 94 within which the effluent is cooled sufficiently to condense ammonia as a liquid therefrom. The ammonia synthesis catalyst is composed of iron oxides ($Fe_2O_3$ and FeO) that have been triply promoted with $K_2O$, $SiO_2$, and $Al_2O_3$. Various shapes and forms of this ammonia synthesis catalyst or any other ammonia synthesis catalyst can be used. A typical composition is: $Fe_2O_3$ 64–66 wt %; FeO 29–31 wt %; $Al_2O_3$ 2–3 wt %; $SiO_2$ 0–0.8 wt %; $K_2O$ 0–2 wt %. The ammonia is removed via line 96. The remaining synthesis gas is recycled via line 98, in which it is supplemented with fresh synthesis gas from line 84, and recycled through the ammonia synthesis loop. A purge line 100 removes a proportion of the gas circulating in the ammonia synthesis loop in order to control the build-up of inert gases in the loop. The purge gas removed from line 100 may, as is known to those skilled in the art, be treated to have removed therefrom argon, ammonia, methane, $CO_2$ and other impurities and be returned as synthesis gas to the process.

Generally, the key operating parameters for autothermal reforming to generate an ammonia synthesis gas are the preheat or inlet temperature (at line 40 of Figure 2), the pressure within autothermal reformer 42 and in the inlet stream (line 40 of FIG. 2), the oxygen to carbon ratio, the $H_2O$ to carbon ratio, and the $N_2$ to carbon ratio. The reference to carbon is of course the carbon content of the hydrocarbon feed and all such ratios are expressed as moles of $O_2$ or $H_2O$ to atoms of carbon. Since the process normally converts carbon oxides to hydrogen as part of the synthesis gas preparation, for ammonia synthesis it is desired that the molar ratio $(CO+H_2)/N_2$ exiting the autothermal reformer be approximately 3:1.

By utilizing the autothermal reforming process as described, a wide variety of hydrocarbonaceous feeds may be utilized and efficiently and economically converted into a nitrogen and hydrogen containing synthesis gas. In addition to petroleum and coal derived hydrocarbons, as mentioned above, biomass-derived feeds providing carbon-containing compounds such as methane and H, O and N in compounds or as elements may be used. Such feeds may also contain sulfur or sulfur compounds. If the sulfur content of the feed is sufficiently high, the sulfur treatment zone as illustrated in FIG. 2 will normally be required. If oxygen and nitrogen are present in the biomass-derived feed in appreciable amounts, they can provide at least a portion of the "air" for the process, and the atmospheric air introduced to the process can be reduced accordingly.

The following examples 4 and 5 show typical operating conditions for the autothermal reformer utilized in accordance with the present invention. As indicated by the examples, generally, the $H_2O$ to C ratio is increased with increasing pressure in order to avoid an excessive increase of the methane content in the synthesis gas.

|  | EXAMPLE 4 35 Atmospheres (525 psia) 1200° F. (649° C.) | | EXAMPLE 5 67.7 Atmospheres (1015 psia) 1200° F. (649° C.) | |
|---|---|---|---|---|
| Pressure |  | (Mole %) |  | (Mole %) |
| Inlet Temperature |  |  |  |  |
| Inlet Stream (line 40 in FIG. 2) (Lb.-Moles/Hr.) |  |  |  |  |
| $CH_4$ | 1.000 | (20.0) | 1.000 | (18.2) |
| $H_2O$ | 2.500 | (50.0) | 3.000 | (54.5) |
| $O_2$ | 0.5722 | (11.4) | 0.6012 | (10.9) |
| $N_2$ | 0.9300 | (18.6) | 0.9060 | (16.4) |
| Exit Stream (line 44 in FIG. 2) (Lb.-Moles/Hr.) |  |  |  |  |
| $CH_4$ | 0.0185 | (0.3) | 0.0199 | (0.3) |
| $H_2O$ | 2.275 | (35.5) | 2.8067 | (40.9) |
| $O_2$ | 0 |  | 0 |  |
| $N_2$ | 0.9300 | (14.5) | 0.9060 | (13.2) |
| $H_2$ | 2.1930 | (34.3) | 2.1535 | (31.4) |
| CO | 0.5991 | (9.4) | 0.5646 | (8.2) |
| $CO_2$ | 0.3851 | (6.0) | 0.4156 | (6.0) |
| Exit Temperature | 1775° F. | (6968° C.) | 1840° F. | (1004° C.) |

While the invention has been described in detail with respect to specific preferred embodiments thereof, it will be appreciated that those skilled in the art, upon a reading and understanding of the foregoing, will readily envision modifications and variations to the preferred embodiments which are nonetheless within the spirit and scope of the invention and of the claims.

What is claimed is:

1. A process for the production of ammonia from a hydrocarbonaceous feed, comprising the steps of:
    (a) introducing an inlet stream comprising a hydrocarbonaceous feed, $H_2O$, air and oxygen at a temperature sufficiently high to initiate catalytic oxidation of the feed into a first catalyst zone comprising a monolithic body having a plurality of gas flow passages extending therethrough and having a catalytically effective amount of palladium and platinum catalytic components dispersed therein, the amounts of feed, $H_2O$, and oxygen introduced into said first catalyst zone being controlled to maintain in said inlet stream an $H_2O$ to C ratio from about 0.5 to 5 and $O_2$ to C ratio of from about 0.35 to 0.65;
    (b) contacting the inlet stream within said first catalyst zone with said palladium and platinum catalytic components to initiate and sustain therein catalytic oxidation of said feed to produce hydrogen and carbon oxides therefrom, the temperature of at least a portion of said monolithic body being at least about 250° F. (139° C.) greater than the ignition temperature of said inlet stream, and oxidizing in said first catalyst zone a quantity, less than all, of said feed, which quantity is sufficient to head such first zone effluent to an elevated temperature high enough to catalytically steam reform, within a second catalyst zone defined below, hydrocarbon remaining in such first zone effluent without supplying external heat thereto;
    (c) passing the first zone effluent, while still at an elevated temperature, from said first catalyst zone to a second catalyst zone containing a catalyst monolith having a platinum group metal steam reforming catalyst dispersed thereupon and contacting the first zone effluent in said second catalyst zone with said reforming catalyst to react hydrocarbons therein with $H_2O$ to produce hydrogen and carbon oxide therefrom;
    (d) withdrawing the effluent of said second catalyst zone as a hydrogen-containing synthesis gas, and removing heat therefrom to cool said synthesis gas;
    (e) reacting carbon monoxide in said synthesis gas with $H_2O$ to produce hydrogen;
    (f) passing said synthesis gas into an ammonia synthesis loop to react the hydrogen with nitrogen thereof over an ammonia synthesis catalyst at ammonia synthesis conditions; and
    (g) withdrawing ammonia as product from said ammonia synthesis loop.

2. The process of claim 1 wherein the proportion of air to oxygen in said inlet stream is such as to provide oxygen enrichment of the air in said inlet stream to at least about 33 volume percent oxygen.

3. The process of claim 1 or claim 2 wherein said hydrocarbonaceous feed is a hydrocarbon feed.

4. The process of claim 3 wherein the preheat temperature is from about 800° F. to 1400° F. (427° C. to 760° C.).

5. The process of claim 4 wherein said first catalyst zone is maintained at a temperature of from about 1750° F. to 2400° F. (954° C. to 1316° C.) and the first zone effluent is introduced into said second catalyst zone at substantially the same temperature.

6. The process of claim 4 wherein a volumetric hourly rate of at least 100,000 volumes of throughput per volume of catalyst is maintained in said first catalyst zone.

7. The process of claim 6 wherein a volumetric hourly rate of from about 2,000 to 20,000 volumes of throughput per volume of catalyst is maintained in said second catalyst zone.

8. The process of claim 4 wherein said first catalyst zone comprises palladium, platinum, and, optionally, rhodium catalytic components distended upon a refractory metal oxide support layer carried on said monolithic body.

9. The process of claim 8 wherein said catalytic component of said first catalyst zone comprises, on an elemental metal basis, about 10 to 90% by weight palladium and about 90 to 10% by weight platinum.

10. The process of claim 9 wherein said catalytic component of said first catalyst zone comprises about 25 to 75% by weight palladium, and about 75 to 25% by weight platinum.

11. The process of claim 10 wherein said catalytic component of said first catalyst zone comprises from about 60 to about 40% by weight platinum and from about 40% to about 60% by weight palladium.

12. The process of claim 8 wherein said steam reforming catalyst comprises one or both of platinum and rhodium catalytic components.

13. The process of claim 8 wherein said steam reforming catalyst comprises, an elemental metal basis from about 10 to 90% rhodium and from about 90 to 10% by weight platinum.

14. The process of claim 13 wherein said steam reforming catalyst comprises from about 20 to 40% by weight rhodium and 80 to 60% by weight platinum.

15. The process of claim 2 wherein said feed is a hydrocarbon and including the additional step of treating the synthesis gas withdrawn from said second catalyst zone to convert carbon monoxide therein to carbon dioxide and then removing carbon dioxide from the synthesis gas to provide a carbon oxides-depleted ammonia synthesis gas.

16. The process of claim 15 wherein the step of converting carbon monoxide to carbon dioxide comprises adding oxygen to the synthesis gas withdrawn from said second catalyst zone and contacting the resulting mixture with a catalyst effective for the selective oxidation of carbon monoxide to carbon dioxide in the presence of hydrogen.

17. The process of claim 16 wherein the oxygen added to said synthesis gas is added as air, and the amount of added air is calculated to bring the nitrogen content of the synthesis gas to from about 2.9 to 3.1:1 molar ratio of hydrogen to nitrogen.

18. The process of claim 3 wherein the amounts of feed, $H_2O$, air and oxygen introduced into said first catalyst zone are controlled to maintain in said inlet stream an $H_2O$ to C ratio of from about 1 to 4, and an $O_2$ to C ratio of from about 0.5 to 0.6.

19. The process of claim 3 wherein the amounts of feed, $H_2O$, air and oxygen introduced into said first catalyst zone are controlled to provide oxygen enrichment of the air in said inlet stream to about 33 to 50 volume percent oxygen.

20. The process of claim 3 carried out at a pressure of from about 100 to 1500 psia.

21. The process of claim 1, wherein the process comprises the additional step of removing sulfur containing compounds and $H_2O$ from the synthesis gas after the carbon monoxide is reacted in said synthesis gas with $H_2O$ to produce hydrogen.

22. The process of claim 1, comprising the additional step of removing carbon dioxide from said effluent of said second catalyst zone.

23. The process for the production of ammonia from a hydrocarbon feed, comprising the steps of:
(a) introducing an inlet stream comprising a hydrocarbon feed, $H_2O$, air and oxygen at a temperature of about 800° F. to 1400° F. (427° C. to 760° C.) and introducing the inlet stream at a pressure of from about 100 to 1500 psia into a first catalyst zone comprising a monolithic body having a plurality of gas flow passages extending therethrough and having a catalytically effective amount of palladium and platinum catalytic components dispersed therein, the amounts of hydrocarbonaceous feed, $H_2O$ and oxygen introduced into said first catalyst zone being controlled to maintain in said inlet stream an $H_2O$ to C ratio of from about 0.5 to 5, and an $O_2$ to C ratio of from about 0.4 to 0.65;
(b) contacting the inlet stream within said first catalyst zone with said palladium and platinum catalytic components at a volumetric hourly rate of at least about 100,000 volumes of throughput per volume of catalyst per hour to initiate and sustain therein catalytic oxidation of said hydrocarbonaceous feed to produce hydrogen and carbon oxides therefrom and oxidizing in said first catalyst zone a quantity, less than all, of said hydrocarbonaceous feed, which quantity is sufficient to heat such first zone effluent to an elevated temperature of from about 1750° F. to 2400° F. (954° C. to 1316° C.); the temperature of at least a portion of the monolithic catalyst being maintained at least about 250° F. (139° C.) above the ignition temperature of the inlet stream;
(c) passing the first zone effluent, while still at said elevated temperature, from said first catalyst zone to a second catalyst zone containing a catalyst monolith having a platinum group metal steam reforming catalyst dispersed thereupon and contacting the first zone effluent in said second catalyst zone with said steam reforming catalyst at an hourly volumetric rate of from about 2,000 to 20,000 volumes of throughput per volume of catalyst to react hydrocarbons therein with $H_2O$ to produce hydrogen and carbon oxides therefrom; and
(d) withdrawing the effluent of said second catalyst zone as a hydrogen-containing synthesis gas; and removing heat therefrom to cool said synthesis gas;
(e) withdrawing the effluent of said second catalyst zone as a hydrogen-containing synthesis gas, and removing heat therefrom to cool said synthesis gas;
(f) reacting carbon monoxide in said synthesis gas with $H_2O$ to produce hydrogen;
(g) passing said synthetic gas into an ammonia synthesis loop to react the hydrogen with nitrogen thereof over an ammonia synthesis catalyst at ammonia synthesis conditions.

24. The process of claim 23 wherein the proportion of air to oxygen is such as to provide oxygen enrichment of the air in said inlet stream from about 33 to 50 volume percent oxygen, whereby to provide a nitrogen-containing hydrogen-rich synthesis gas.

25. The process of claim 24 further including converting carbon monoxide in the effluent of said second catalyst zone to carbon dioxide and then removing carbon dioxide from said effluent of said second catalyst zone.

26. The process of claim 25 wherein the effluent withdrawn from said second catalyst zone is further treated to remove sulfur and sulfur compounds therefrom.

27. The process of claim 23 or claim 24 wherein said platinum group metal catalyst of said first catalyst zone comprises palladium, platinum, and, optionally, rhodium catalytic components and said steam reforming catalyst comprises platinum and rhodium catalytic components.

28. The process of claim 27 wherein said catalytic components of said first catalyst zone comprise, on an elemental metal basis, about 10 to 90% by weight palladium, 90 to 10% by weight platinum and said catalytic components of said second catalyst zone comprise, on an elemental basis, about 10 to 90% by weight rhodium and 90 to 10% by weight platinum.

29. The process of claim 28 wherein said catalytic components of said first catalyst zone comprise about 25 to 75% by weight palladium, 75 to 25% by weight platinum and said catalytic components of said second catalyst comprise comprise about 20 to 40% by weight rhodium, and 80 to 60% by weight platinum.

30. The process of claim 23, wherein the process comprises the additional step of removing sulfur containing compounds and $H_2O$ from the synthesis gas after the carbon monoxide is reacted in said synthesis gas with $H_2O$ to produce hydrogen.

31. The process of claim 23, comprising the additional step of removing carbon dioxide from said effluent of said second catalyst zone.

* * * * *

UNITED STATES PATENT AND TRADEMARK OFFICE
CERTIFICATE OF CORRECTION

PATENT NO. : 4,863,707

DATED : Sep. 5, 1989

INVENTOR(S) : William T. McShea, III and Robert M. Yarrington

It is certified that error appears in the above—identified patent and that said Letters Patent is hereby corrected as shown below:

Col. 1, line 33: replace "possible" with --possibly--; line 43: replace "synthetic" with --synthesis--. Col. 4, line 20: replace "1000" with --1100--; line 35: replace "hydrocarbon" with --hydrogen--. Col. 7, line 33: replace "Period" with --Periodic--. Col. 10, in Table IB insert the subheading --PGM-- after the heading "TABLE IB."

Signed and Sealed this

Second Day of April, 1991

Attest:

HARRY F. MANBECK, JR.

Attesting Officer

Commissioner of Patents and Trademarks